A. L. TUTTLE.
MANUFACTURE OF SUPERPHOSPHATE.
APPLICATION FILED JAN. 15, 1921.
1,398,816.
Patented Nov. 29, 1921.
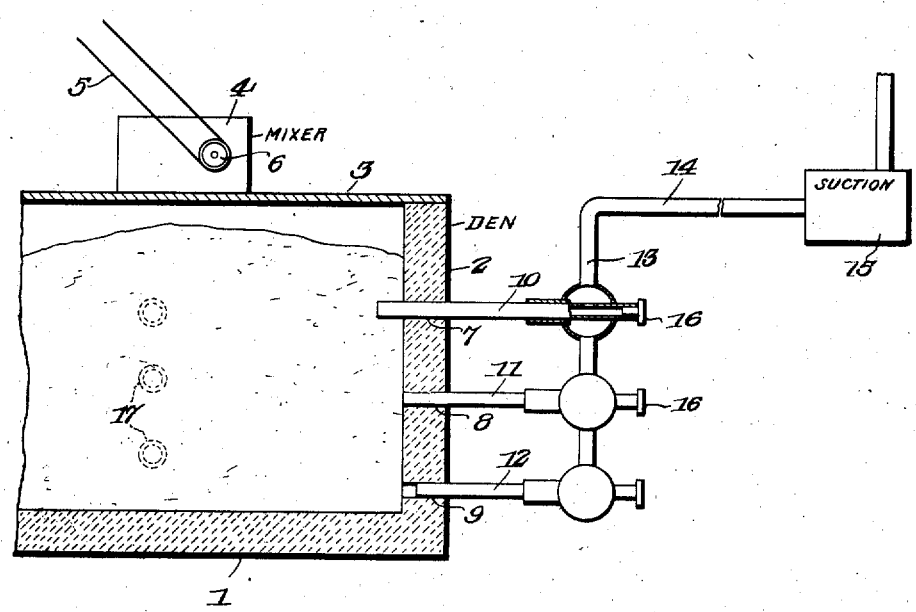

UNITED STATES PATENT OFFICE.

ARTHUR L. TUTTLE, OF ATLANTA, GEORGIA, ASSIGNOR TO SOUTHERN AGRICULTURAL CHEMICAL CORPORATION, OF NEW YORK, N. Y., A CORPORATION OF VIRGINIA.

MANUFACTURE OF SUPERPHOSPHATE.

1,398,816.  Specification of Letters Patent.  Patented Nov. 29, 1921.

Application filed January 15, 1921. Serial No. 437,496.

*To all whom it may concern:*

Be it known that I, ARTHUR L. TUTTLE, a citizen of the United States, residing at Atlanta, Georgia, have invented certain new and useful Improvements in the Manufacture of Superphosphate, of which the following is a specification.

The present invention relates to the production of superphosphate, and contemplates an improvement in the method of treating the mixture of phosphate rock and sulfuric acid after the same is dumped into the "den" from the mixing machine.

In the manufacture of superphosphate it is customary to intimately mix sulfuric acid of about chamber strength, say 50 to 52° Bé., this mixing being done in a revolving cast iron pan, mounted upon the top of the den, the mixture thereby produced is dropped or dumped into a den or a large bin, usually made of concrete or masonry, upon the top of which the mixer is mounted. The mixture is left in the den, for the chemical reaction between the sulfuric acid and the phosphate rock to complete itself, usually from eight to twenty-four hours or longer.

In operating the process of my present invention, the above mentioned steps are carried out in the conventional manner.

When the sulfuric acid reacts with the ground phosphate rock, considerable quantities of gas and water vapor are given off. In the usual practice these are allowed to escape from the top of the den through a chimney or flue provided for the purpose, and in some cases an exhaust fan is connected with the flue in order to carry off the gases and water vapor more effectively.

I have found that on account of the evolution of gases and water vapor within the mixture of phosphate and acid in the den, that is to say below the surface of the mixture in the den, there is produced more or less pressure within the reacting materials, and that if an opening or openings be made through the side walls of the den, below the surface of the reacting mixture, the gas and water vapor can be expelled by this pressure, through these holes.

The action of the mixture in liberating the gases and water vapor causing somewhat of a honey-combed structure in the reacting mass, whereby the mass tends to remain open and porous so that the gas evolved even at a considerable distance away from said holes may readily find its way to said holes and thereby be drawn off or conducted away from the interior of the mixture.

The invention may readily be understood by referring to the accompanying drawing showing a diagrammatic sectional view of a prosphate den and the connections thereto made in accordance with the present invention.

In the said drawing (1) represents the bottom or floor of the den; (2) a side wall thereof and (3) an air tight top or cover for the den. (4) is a mixer, conveniently operating by a belt (5) running over a pulley (6).

In the said wall (2) are provided, in accordance with the present invention, a series of holes 7, 8, 9, of which any desired number may be provided. Through these holes extend pipes (10), (11) and (12) respectively, such pipes being connected to a header (13). A number of these headers may connect to a flue or large pipe (14) which may extend to a chimney or to a point outside of the building to merely discharge the gases and water vapor into the atmosphere. I prefer, however, to locate in the flue (14) a suitable suction pump or blower (15) for purposes described below.

In the drawing the pipe (10) is shown as passing entirely through the wall (2) and extending a short distance into the mass of superphosphate. The pipe (11) is shown as extending to a point about flush with the inner face of the wall (2); the pipe (12) is shown as extending into, but not all the way through, the wall (2). It is understood that any one of these three means of connection can be employed, but it is preferable that the pipes form substantially air-tight connections with the wall (2).

On the ends of pipes (10), (11) and (12) are located caps or plugs (16) which are removable, for the purpose of poking or driving a rod, such as a crowbar into the mass of superphosphate material in the den for the purpose of loosening up the same in front of and adjacent to the ends of these pipes in order that the gases and steam may find their way into the pipes readily. Suitable means will, of course, be provided for shutting off the connections between the pipes (10), (11) and (12) and pipe (13) during this poking operation.

There may be any desired number of pipes or any desired number of rows of pipes entering the side wall (2). I have also shown in dotted lines other pipes (17) entering the back wall of the den, which pipes likewise may be connected to the exhaust flue (14).

The more moisture or water which is removed from the acid phosphate while it is in the den the better is the resulting acid phosphate. Since water evaporates more readily at sub-atmospheric pressure (*i. e.*, in a partial vacuum), it is advisable to connect the exit pipes, at some point, with a suitable suction producing device, as illustrated diagrammatically at (15) in the drawing. By the use of the suction device considerably more moisture can be removed from the material in the den than would be removed if dependence were placed entirely upon the pressure existing in the mass. The vacuum, or reduced pressure, not only removes more moisture but does this at a lower temperature both of which are advantageous in the operation.

The acid phosphate in the den is rather porous and honey-combed so that a channel opened up in the mass by poking a rod through the pipes lengthwise into the acid phosphate (for example, by removing the caps 16), provides a comparatively free escape passage for the steam and water vapor. The step of poking the mass with rods may be repeated as often as necessary but it will ordinarily be found that a single operation of driving the rod vigorously into the mass of reacting material will loosen up the same considerably and it will not be necessary to repeat this operation again for a considerable time.

By the use of this invention, I am able to more effectively carry off the gases and steam produced in the reaction between the phosphate rock and the acid. This leads to a more complete reaction of the acid with the phosphate rock, thereby reducing the amount of "insoluble phosphoric acid" and reducing the amount of free sulfuric acid in the finished product, and also produces a superphosphate product which is easier to grind up or crush and is accordingly easier to mix with the other materials, when the superphosphate is used for producing a mixed fertilizer. An added advantage of the process is the saving of time. It allows the dens to be discharged in a less number of hours after the mixing is completed, thus allowing the use of smaller dens for the same capacity of output. It also allows quicker curing of the product outside of the dens, thus requires less time in storage (reducing the storage capacity required) and also produces acid phosphate of much better mechanical condition.

It is to be understood that in operating the process of my present invention, if a pressure below atmospheric (or vacuum or partial vacuum) is to be employed, this may be used during substantially the entire period in which the phosphate and acid mixture remains in the den, or for a portion of this time only. The vacuum may also be continuous or intermittent and may be uniform or variable.

In some cases other materials are mixed with the phosphate rock before or at the time of adding the sulfuric acid, and such procedure is not intended to be excluded in the process of my present invention. Leather scrap, and the like, are mentioned as examples of ammoniates to be so added.

The invention of the present case may be used both in the manufacture of ordinary superphosphate, and also in the manufacture of double superphosphate.

I claim—

1. In the process of making acid phosphates, the herein described improvement which comprises venting a mass of raw mixture containing phosphate and acid, at a point below its surface, and allowing the generated steam and gases to freely escape therefrom during the period of reaction.

2. In the process of making acid phosphates, the herein described improvement which comprises venting a mass of raw mixture containing phosphate and acid, at a point below its surface, and maintaining a pressure below atmospheric in the mass of reacting materials at points below the surface thereof during a substantial part, at least, of the period of reaction.

3. A superphosphate den, having at substantially below the normal charge level therein, a vent for steam and gases liberated in the reaction, and means for conducting away such steam and gases, such den being a covered chamber having an unobstructed interior and having a mixer mounted above the same.

4. A superphosphate den, having at substantially below the normal charge level therein, a vent for steam and gases liberated in the reaction, means for conducting away such steam and gases, and a suction-producing device associated with such conducting means, such den being a covered chamber having an unobstructed interior and having a mixer mounted above the same.

In testimony whereof I affix my signature.

ARTHUR L. TUTTLE.